Nov. 17, 1953

J. R. BOYLE 2,659,579

MILK COOLER

Filed Nov. 10, 1950

INVENTOR.
John R. Boyle,
BY Brown, Jackson,
Boettcher & Dienner
Attys

Nov. 17, 1953      J. R. BOYLE      2,659,579
MILK COOLER
Filed Nov. 10, 1950      2 Sheets-Sheet 2
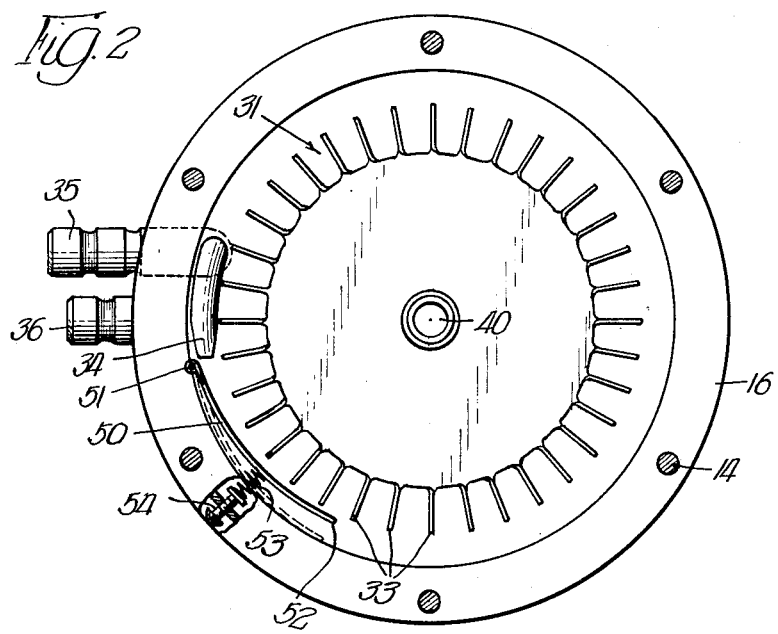
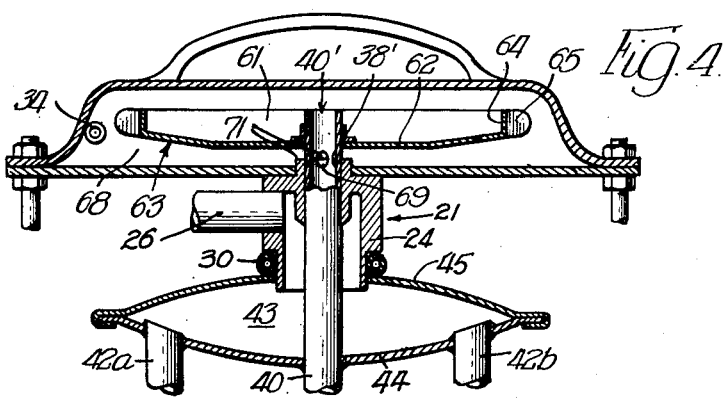
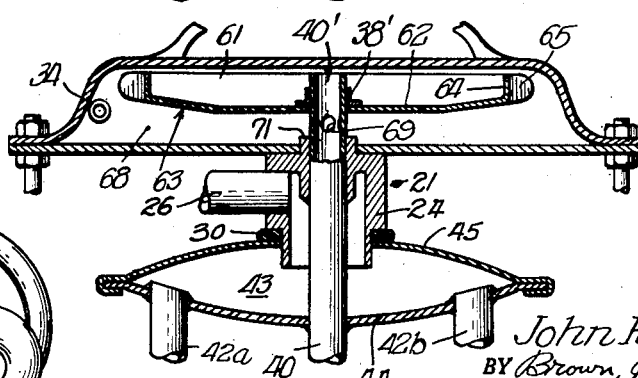
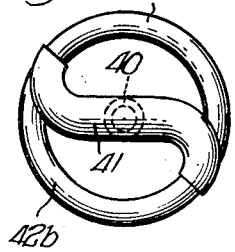
INVENTOR.
John R. Boyle,
BY Brown, Jackson,
Boettcher + Dienner
Attys Patented Nov. 17, 1953

2,659,579

UNITED STATES PATENT OFFICE 2,659,579

MILK COOLER

John R. Boyle, Chicago, Ill., assignor to
Edward A. Mertes, Chicago, Ill.

Application November 10, 1950, Serial No. 194,988

10 Claims. (Cl. 257—74)

The present invention relates to milk coolers, and more particularly to that type of cooler which can be employed for cooling milk while it is contained within the conventional milk can used by farmers, dairy men, etc.

My improved cooler comprises a rotatable cooling coil which is adapted to be inserted down into the open top of the milk can so that the coil is immersed in the milk for effecting a heat transfer from the milk to the cooling liquid flowing through the coil, and for also causing a circualtory flow of the milk between the turns of the rotating cooling coil for equalizing the cooling effect throughout the entire body of milk. Cold water is preferably the cooling medium that is circualted through the turns of the rotating cooling coil. The supply pressure of this cold water is utilized for imparting the rotary movement to the cooling coil, such being accomplished by having the entering water first impinge against a rotating water wheel which is mechanically connected to revolve the cooling coil. After impinging against the water wheel, the cold water is thence conducted through the convolutions of the cooling coil for absorbing the heat from the milk. In the preferred embodiment of my improved cooler, the discharge water from the cooling coil is preferably conducted away from the device through a waste pipe or conduit, so that there is no water flow down over the outside of the milk can. In such construction, the milk can does not need to be placed in any tank, trough or container for receiving water sluiced down over the outside of the can, but instead the cooler can be used in cans setting anywhere on the floor of the milk house, barn, loading platform or the like. However, the invention is not to be limited to this discharge of water from the cooling coil through the waste conduit, because other features of the invention can be embodied in such other type of construction in which the waste water from the cooling coil is sluiced or sprayed down over the outside of the milk can.

One of the objects of the invention is to provide an automatic speed control for automatically governing the rotative speed of the water wheel and cooling coil. These milk coolers may be employed in different localities where there may be a wide difference of supply pressures of the cooling water, or where the pressure may vary considerably at different times of the day, depending upon load conditions. The proper speed of rotation of the cooling coil is quite an important factor in obtaining maximum efficiency from the cooling device. If the rotative speed is too low the maximum rate of heat transfer is not obtained and there is not an adequate circulation of the milk in the can. On the other hand, if the rotative speed is too high there is a tendency to churn the milk, with possible entrainment of air, etc. In the appended detail description of my invention I have disclosed two embodiments of automatic speed control; one in which the pressure and velocity of the water issuing from the nozzle acts against an automatic spring vane which deflects a greater or lesser amount of the water into the turbine vanes of the water wheel, depending upon the pressure; and the other in which the supply pressure of the water is used to control the position of the turbine wheel relatively to the inlet nozzle by vertically displacing the wheel with respect to the nozzle under increased pressure conditions.

Another object of the invention is to provide an improved pressure responsive rotary seal for sealing the rotary joint between the rotating coil system and the outlet fitting which connects with the waste water conduit or pipe. When there is no water pressure acting upon the device this pressure responsive rotary seal is relaxed so that it offers a minimum amount of friction to the initial starting rotation of the water wheel and coil when the water pressure is first admitted to the device. This insures the starting of the water wheel and coil even under extremely low water pressures. As the water pressure builds up, the pressure responsive rotary seal is gradually compressed to make a tighter joint, whereby the tightness of the joint increases with rise of pressure so as to maintain the joint tight under higher pressures.

Another object or feature of the invention is the provision of a rotary deflecting spinner co-operating with the pressure responsive rotary seal, whereby any leakage water leaking past the rotary seal, particularly at the start of the operation, will be deflected and whirled outwardly beyond the open top of the milk can, so that this leakage water will not enter the can.

Other objects, features and advantages of the invention will be apparent from the following detail description of two preferred embodiments thereof. In the accompanying drawings illustrating such embodiments:

Figure 2 is a horizontal sectional view through the turbine wheel chamber, corresponding to a section taken approximately on the plane of the line 2—2 of Figure 1;

Figure 3 is a detail view on a smaller scale illustrating the connection between the lower end of the rotating tubular stem and the cooling coils extending upwardly therefrom;

Figure 1:
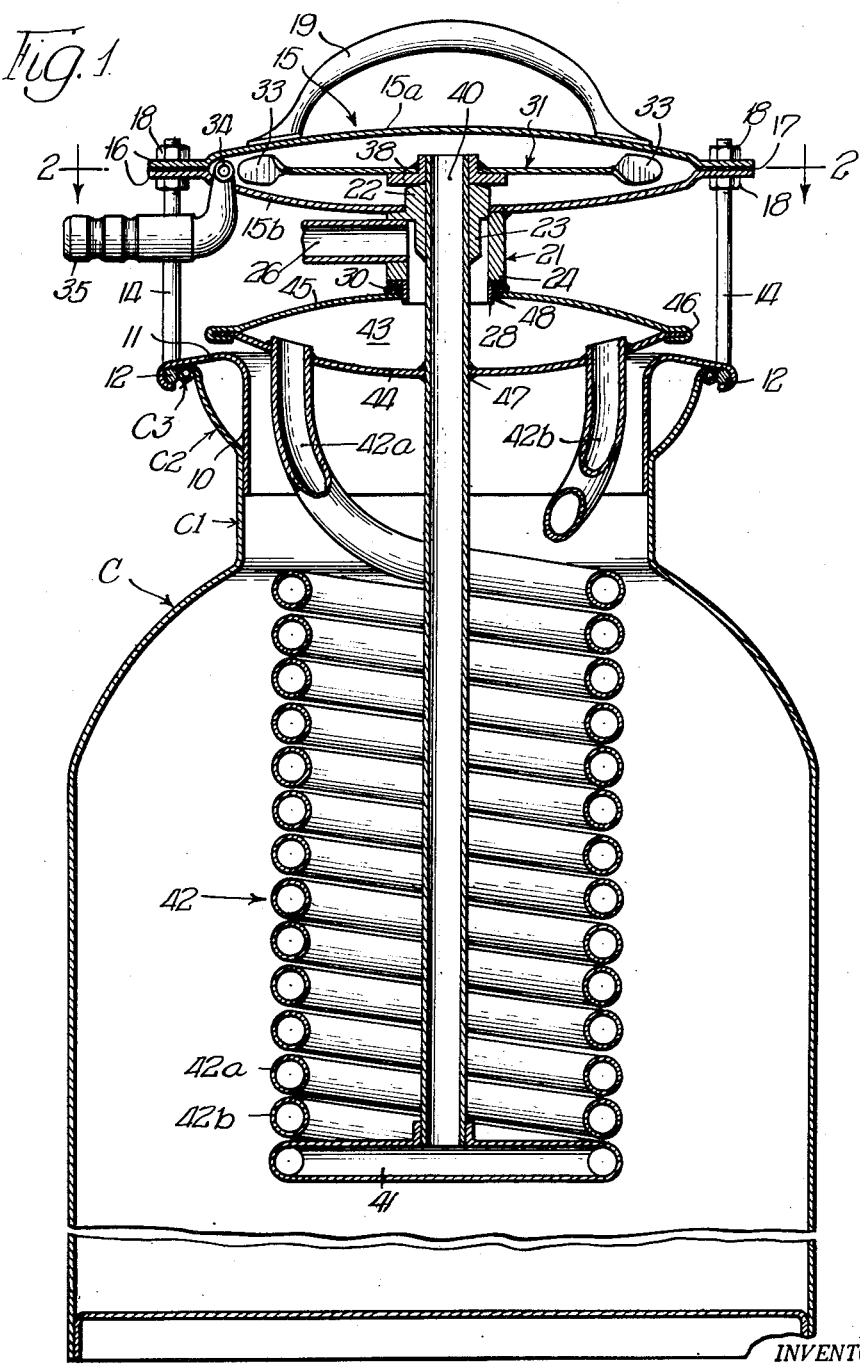
Figure 1 is a vertical axial sectional view through one embodiment of my improved milk cooler, showing the latter mounted in a conventional milk can.

Figure 4 is a fragmentary axial sectional view through the upper portion of a modified embodiment of the invention, showing the position of the turbine wheel and the pressure responsive rotary seal when no water pressure is active on the device; and Figure 5 is a view similar to Figure 4 showing the position of the turbine wheel and the pressure responsive rotary seal when a relatively high water pressure is active on the device.

I have shown the embodiment of Figures 1 and 2 mounted in the upper end of a conventional milk can C, of the type commonly used on dairy farms, dairies and the like for holding milk or cream. These cans are usually formed with a reduced neck C1 having an outwardly flared upper end C2 terminating in a rolled edge C3. My improved milk cooler is adapted to have resting support upon the rolled upper edge C3 through the medium of a tubular support 10 having an outwardly extending flange 11 at its upper end which is adapted to rest upon the rolled upper edge C3 of the can. The lower edge of the tubular supporting ring 10 is adapted to extend down into the neck C1 of the can for properly centering the milk cooler in the can. The outer edge of the flange 11 is rolled over a metallic supporting ring 12, from which vertical standards 14 extend upwardly at angularly spaced points. Mounted at the upper ends of these supporting standards 14 is a turbine wheel housing 15 comprising upper and lower housing sections 15a and 15b. The outer edges of these housing sections have matching flanges 16, 16 between which is clamped a sealing gasket 17. The supporting standards 14 extend through holes in these flanges and gasket and receive nuts 18 which screw over threads on the upper ends of the standards and clamp the two housing sections together. If desired, a handle 19 may be secured to the upper housing section 15a to facilitate inserting the cooler into cans and removing it therefrom.

Secured centrally in the lower housing section 15b is a casting or like member 21 which serves as a main bearing for the rotating system and also serves as a non-rotating outlet fitting for discharging the waste water from the cooling coil. The bearing portion of this casting comprises a bearing hub 22 which is welded, brazed or soldered in an aperture in the lower housing 15b, and which has a downwardly extending skirt portion 23, so as to provide a sufficient length of bearing. Surrounding this skirt portion is an outer tubular extension 24 which functions as the outlet fitting for the waste water, such waste water discharge preferably occurring through an outlet pipe or duct 26 opening outwardly through the wall 24 of the fitting. The lower end of the wall 24 is formed with a downwardly extending reduced flange 28 which defines a right angle recess in the lower portion of the fitting for receiving the pressure responsive rotary seal 30, as I shall presently describe.

Revolving horizontally within the housing 15 is a turbine wheel 31, preferably in the form of a solid disc having turbine vanes 33 projecting from the periphery thereof, as best illustrated in Figure 2. The cold water or other liquid coolant is adapted to be discharged into these vanes 33 through a nozzle 34 which is pointed in a direction to project the liquid substantially tangentially of the tip ends of the blades. This nozzle 34 is supplied through an inlet fitting 35 which is secured in the housing 15, preferably in the lower section 15b. The outlet for the waste coolant also has an outlet fitting 36, these two fittings preferably being of the type for conveniently receiving rubber hoses, although it will be understood that threaded pipe connections might be employed in a permanent installation. The disc of the turbine wheel 31 is secured to a hub 38 which in turn is secured to the upper end of a tubular drive shaft 40 that supports the cooling coil, drives the cooling coil, and supplies the liquid cooling medium to the inlet end of the cooling coil. The upper end of the tubular drive shaft 40 is open for receiving the cold water or other liquid coolant and venting it from the turbine wheel chamber 15 after the liquid has expended a substantial part of its velocity energy against the vanes of the turbine wheel. This upper portion of the tubular shaft 40 is journalled for rotation in the bearing hub 22 and depending bearing skirt 23. Secured to the lower end of the tubular shaft 40 is a tubular lower header 41 (Figure 3), which supports and communicates with the lower end of the cooling coil assembly 42. This may consist of a single coil, if desired, but I prefer to use two coils connected in parallel for greater capacity. The lower ends of these two coils 42a and 42b are connected to the curved ends of the lower header 41, and extend upwardly therefrom with their convolutions in alternating sequence. The upper ends of the two coils open vertically into an outlet header or chamber 43 surrounding the tubular shaft 40 and opening upwardly into the open lower end of the outlet fitting 21 for discharge through outlet duct 26. The bottom wall of this outlet header or chamber consists of an upwardly facing cupped disc 44 of rigid stiffness, and the top wall of this outlet header consists of a downwardly facing cupped disc 45, which latter disc, however, is relatively thin and flexible so as to flex through an appreciable range of movement in response to the outlet pressure of the water entering this chamber from the upper ends of the two cooling coils. The outer edge of the flexible upper disc 45 is crimped over the edge of the rigid lower disc 44, and the central aperture in the rigid lower disc is welded, brazed or soldered to the tubular shaft 40 at 47. The flexible upper disc 45 has a central aperture 48 which has a free sliding fit over the downwardly extending flange 29 of the outlet fitting 21. This portion of the flexible upper disc 45 bears against the under side of the rotary seal 30. The parts are so proportioned and constructed that when there is no liquid pressure prevailing in the outlet header 43 the flexible upper disc 45 will be exerting very little, if any, compression pressure against the sealing ring 30, but that as pressure becomes effective in the outlet header 43 the flexible disc 45 is pressed upwardly and thereby exerts pressure against the under side of the sealing ring for establishing a relatively tight rotary sealed joint at the ring. The fact that the ring is under very light, if any, sealing pressure when no water pressure exists in the device insures that there will be minimum sealing ring friction at the start of the operation, thereby assuring easier starting. Attention is directed to the fact that the peripheral edge of the outlet header 43, defined by the crimped flange 46 joining the two discs, lies radially outwardly of the beginning of the down slope of supporting flange 11. Thus, any leakage occurring around the sealing ring 30 when liquid pressure is first applied to the device, will be drained and spun outwardly down over the flange 11 for precipitation down over the sides of the can, so that this leakage water cannot enter the interior of the can. As the supply pressure becomes effective in the header chamber 43, this starting leakage at the seal 30 is eliminated, or reduced to an acceptable minimum.

Referring now to the pressure responsive speed regulation which is effective at the turbine wheel 31, it will be seen from Figure 2 that the discharge from the nozzle 34 is made to impinge against a spring vane 50 which normally tends to deflect the major portion of the water stream against the turbine vanes 33. That end of the vane 50 which is located adjacent to the nozzle 34 is mounted on a vertical pivot 51 having its ends supported in the top and bottom walls of the turbine housing 15. From this pivot 51 the spring vane curves toward the turbine vanes 33, so that the swinging extremity 52 of the regulating vane normally lies very close to the outer ends of the turbine vanes. The spring vane 50 is normally held in this position by a compression spring 53 pressing inwardly against the outer side of the spring vane. An adjusting screw 54 supports the outer end of the compression spring 53 and has threaded mounting in the wall of the turbine wheel chamber 15, the outer end of such screw 54 being accessible for adjustment, so that the pressure imposed by the spring 53 against the deflecting vane 50 can be adjusted, if desired, to vary the range of automatic control effected by the deflecting vane. Under relatively low supply pressures, or under a predetermined normal supply pressure, the deflecting vane 50 will occupy substantially the position shown in full lines in Figure 2, where it will deflect the major portion of the water issuing from the nozzle 34 into the pockets between the turbine vanes 33. However, if a substantially higher supply pressure is applied to the device, this higher pressure will deflect the speed regulating vane 50 in an outward direction so that its free end 52 will be spaced a greater distance from the tip ends of the turbine vanes 33, substantially as indicated in dotted lines in Figure 2, whereby a larger proportion of the water will be allowed to discharge tangentially of the turbine wheel without impingement reaction against the turbine vanes.

In this regard, another automatic speed regulating function is exerted by the flexible upper disc 45 of the outlet header 43 bearing against the sealing ring 30. As previously described, increased water pressure in the outlet header 43 flexes the upper disc 45 upwardly against the sealing ring 30 under increasing pressure, and this increasing pressure exerts an increasing frictional braking torque against the rotation of the cooling coil assembly 42. Thus, the increasing liquid pressure also tends to exercise an automatic speed regulating control by causing the sealing ring to exert greater and greater frictional retardation against the substantial increases of speed which would otherwise arise from the increasing water pressure.

I have found that optimum conditions for cooling the milk without objectionable churning are obtained when the above described cooling coil assembly is rotated at speeds ranging from approximately 130 R. P. M. to 170 R. P. M. Lower speeds appreciably reduce the heat transfer, and higher speeds tend to produce objectionable churning of the milk. The direction of rotation of the cooling coil assembly 42 is preferably so related to the direction of pitch of the coils 42a and 42b that the milk is caused to spiral up from the bottom of the can C, passing into the rotating helical coils, and thence being forced out of the coils by centrifugal force. This outward flow of milk from between the coils, under the action of centrifugal force, thence passes approximately to the circumference of the can, and the flow then descends to the bottom of the can, for repeated circulation up through the center of the can to the rotating cooling coil.

In Figures 4 and 5 I have illustrated a modified embodiment of my invention in which the automatic speed regulation is effected by a pressure responsive vertical displacement of the turbine wheel. This pressure responsive vertical displacement of the turbine wheel also serves to place increasing pressure upon the rotary sealing ring with increase of pressure in the water or coolant supplied to the device. In this embodiment the entire rotating system consisting of the tubular drive shaft 40, cooling coil assembly 42, outlet header 43 and turbine wheel 61 can rise and fall as a unit by vertical sliding motion of the tubular shaft 40 in the bearing hub 22, 23. In this modified embodiment the turbine wheel 61 comprises a solid disc 62 which is substantially flat over the central portion of its area, but which tapers or slopes upwardly around its outer portion, as indicated at 63. This disc is formed with an upwardly extending peripheral flange 64, and the vanes 65 are shown as being punched out of this flange 64, although it will be understood that the vanes might be otherwise formed or provided on the turbine wheel. The disc 62 is rigidly secured to a hub ring 38' which in turn is rigidly secured to the upper portion of the tubular drive shaft 40. The upper end of the tubular drive shaft is completely open to the space 67 above the turbine wheel 61 through the unrestricted port area 40' at the top of the shaft. That portion of the turbine wheel chamber area which lies below the turbine wheel 61, as indicated at 68, also has discharge communication into the interior of the hollow drive shaft 40, but this communication from such lower space 68 is through a restricted port area established by one or more holes 69 formed in the wall of the hollow drive shaft below the turbine wheel. Vertical movement of the shaft 40 causes these ports 69 to move upwardly and downwardly relatively to a blocking edge 71 formed at the top of the bearing hub 22 and closely surrounding the shaft. When the rotating system is in the lower position illustrated in Figure 4, a substantial part of the area of the ports 69 is blocked off by the blocking edge or flange 71, so that the effective area through the ports 69 is much smaller than the effective area through the open top 40' of the tubular shaft. Thus, a greater volume of liquid will be discharged down through the tubular shaft from the top side of the turbine wheel, with the result that a lower pressure will prevail in the upper space 67 than in the lower space 68. When this pressure differential is sufficient to lift the weight of the moving system it slides upwardly, thereby exposing a greater area of the ports 69 above the blocking edge 71. This regulating control of the effective area of the ports 69 results in the rotating system assuming different vertical positions, depending upon the pressure of the liquid supplied to the device.

This shift in vertical position is utilized to perform a speed regulating control by so disposing the water inlet jet 34 that its effective impingement against the turbine vanes 65 will decrease as the turbine wheel moves upwardly to higher positions in response to higher supply pressures. Thus, when the turbine wheel is in its lowermost position the discharge from the jet 34 has a relatively high or maximum effectiveness against the turbine wheel vanes 65, as shown in Figure 4. However, as the moving system is carried upwardly by increased supply pressure the vanes 65 are lifted more or less out of the path of maximum impingement from the inlet jet 34, so that a considerable or major portion of the water passes down along the tapered slope 63 of the vane wheel and under the wheel to the ports 69 without acting on the turbine vanes, as illustrated in Figure 5. In this manner, increased supply pressure is prevented from rotating the vane wheel and cooling coil at an objectionably high speed.

This pressure responsive vertical displacement of the moving system is also effective to automatically regulate the pressure on the rotary sealing ring 36 in response to pressure changes. For example, in the low pressure or no pressure position of the moving system illustrated in Figure 4 the sealing ring 36 is relaxed or expanded into a condition of minimum friction. On the other hand, as the moving system shifts upwardly, the sealing ring is compressed to a greater and greater extent with each increase in supply pressure. Here again, the increasing frictional braking effect of the sealing ring also exerts a speed regulating action as described above of the preceding embodiment. The top disc 46 of the outlet header 43 may be made sufficiently flexible to be pressure responsive, as described of the preceding embodiment, or it may be rigid so that the variable compression of the sealing ring will be dependent solely upon the axial shift of the moving system.

While I have illustrated and described what I regard to be the preferred embodiments of my invention, nevertheless it will be understood that such are merely exemplary and that numerous modifications and rearrangements may be made therein without departing from the essence of the invention. For example, my improved apparatus can be used for performing a pasteurizing operation by flowing a heating medium such as hot water or steam through it.

I claim:

1. In cooling apparatus of the class described, the combination of a rotatable cooling coil, supporting means for rotatably supporting said coil, a water motor for revolving said coil comprising a turbine wheel against which the entering water is adapted to impinge, and means automatically responsive to the pressure of the entering water for controlling the effectiveness of the action of the water jet against said wheel, whereby to prevent wide variations of pressure of the entering water from producing wide variations of speed in the turbine wheel.

2. In cooling apparatus of the class described, the combination of a rotatable cooling coil, supporting means for rotatably supporting said coil, a turbine wheel for revolving said coil, a jet for projecting a stream of water against said turbine wheel, means for causing the water which has been discharged against said turbine wheel to thereafter circulate through said cooling coil in the performance of the cooling function, water outlet means comprising a non-rotating outlet fitting receiving the water from said coil, and including a non-rotating outlet pipe leading from said outlet fitting, and means automatically responsive to the pressure of the water supplied to said jet for controlling the effectiveness of said jet on the turbine wheel for obtaining automatic speed regulation, by increasing the effectiveness of said jet under low water pressures and decreasing the effectiveness of said jet under high water pressures.

3. In apparatus of the class described for cooling milk in the conventional milk can, the combination of a support adapted to rest in the open top of said can, a cooling coil rotatably mounted on said support and adapted for immersion in the milk, a rotatable tubular shaft rotatably supporting said cooling coil and connected therewith for circulating cooling water therethrough, a turbine wheel connected with the upper end of said tubular shaft, a housing for said turbine wheel, a water inlet jet in said housing for discharging inlet cooling water against said turbine wheel, and a pressure responsive vane for controlling the impingement of the water discharging from said nozzle against said turbine wheel.

4. In apparatus of the class described for cooling milk in the conventional milk can, the combination of a support adapted to rest in the open top of said can, a turbine wheel housing carried by said support, a turbine wheel in said housing provided with reaction vanes, a water inlet nozzle opening into said housing to discharge inlet cooling water against the vanes of said turbine wheel, a tubular drive shaft rotatably supporting said turbine wheel in said housing and extending downwardly therefrom, a cooling coil supported by said shaft and having communication with the interior thereof, the cooling water, after exerting impulse reaction on the vanes of said turbine wheel, passing downwardly from said chamber through said shaft and thence upwardly through said cooling coil, discharge means for discharging the cooling water from the upper end of said cooling coil, and means for regulating the rotative speed of said turbine wheel and cooling coil comprising a deflecting vane for deflecting water from said nozzle into the turbine vanes and movable to different positions depending upon the pressure of the water issuing from said nozzle.

5. In apparatus of the class described for cooling milk in the conventional milk can, the combination of a support adapted to rest in the open top of said can, a turbine wheel chamber carried by said support, a turbine wheel in said chamber, a cooling water inlet nozzle in said chamber for directing inlet water against the vanes of said turbine wheel, a tubular shaft rotatably supporting said turbine wheel, a cooling coil communicating with the interior of said shaft and rotated thereby, the water, after impingement reaction on the vanes of said turbine wheel passing through said tubular shaft and through said cooling coil for cooling the milk, and speed regulating means operative to cause vertical displacement of said turbine wheel in response to different pressures of the cooling water whereby to change the effectiveness of the nozzle discharge against the vanes of said turbine wheel.

6. In apparatus of the class described for cooling milk in a milk container, the combination of a support adapted to rest on said container, a housing carried by said support, a reaction wheel rotatably mounted in said housing, a cooling water inlet nozzle in said housing for directing entering water against said reaction wheel for rotating the latter, a tubular drive shaft extending downwardly from said reaction wheel and driven thereby, a cooling coil rotated by said shaft and communicating with the interior thereof, the cooling water after reaction impingement against said reaction wheel passing downwardly through said tubular drive shaft and through said cooling coil for cooling the milk, an outlet connection through which the discharge end of said cooling coil discharges, a rotary seal for said outlet connection, and means shiftable axially of said seal in response to the pressures of the water supplied to said nozzle for automatically causing the sealing pressure against said rotary seal to vary substantially in accordance with different water pressures supplied to said inlet nozzle.

7. In apparatus of the class described for cooling milk in a milk container, the combination of a support adapted to rest on said container, a housing carried by said support, a reaction wheel rotatably mounted in said housing, a cooling water inlet nozzle in said housing for directing entering water against said reaction wheel for rotating the latter, a tubular drive shaft extending downwardly from said reaction wheel and driven thereby, a cooling coil rotated by said shaft and communicating with the interior thereof, the cooling water after reaction impingement against said reaction wheel passing downwardly through said tubular drive shaft and through said cooling coil for cooling the milk, an outlet chamber connecting with the discharge end of said coil, said outlet chamber rotating with said coil, a stationary outlet connection leading from said outlet chamber, a rotary seal for establishing a relatively tight joint between said outlet chamber and said outlet connection, and a flexible diaphragm comprising part of said outlet chamber arranged to respond automatically to the pressure of the water therein for exerting a sealing pressure against said rotating seal which varies with the pressure of the water in said outlet chamber, whereby the rotary seal presents minimum friction to rotation under low starting pressures or low running pressures.

8. In apparatus of the class described for cooling milk in a milk container, the combination of a support adapted to rest on said container, a housing carried by said support, a reaction wheel rotatably mounted in said housing, a cooling water inlet nozzle in said housing for directing entering water against said reaction wheel for rotating the latter, a tubular drive shaft extending downwardly from said reaction wheel and driven thereby, a cooling coil rotated by said shaft and communicating with the interior thereof, the cooling water after reaction impingement against said reaction wheel passing downwardly through said tubular drive shaft and through said cooling coil for cooling the milk, an outlet chamber connecting with the discharge end of said cooling coil and rotating therewith, a stationary outlet connection leading from said outlet chamber, a sealing ring for sealing the rotating joint between said outlet chamber and said outlet connection, and means for causing vertical displacement of the upper wall of said outlet chamber in response to changes of pressure of the water supplied to said nozzle whereby to exert different degrees of sealing pressure against said sealing ring with changes of water pressure, for minimizing starting friction and also exercising an automatic speed regulating control on said reaction wheel.

9. In apparatus of the class described for cooling milk in a milk container, the combination of a support adapted to rest upon said milk container, a turbine wheel housing carried by said support, a substantially vertical tubular drive shaft entering said housing, a turbine wheel mounted on said shaft within said housing, a cooling water inlet nozzle in said housing directing cooling water against the vanes of said turbine wheel, a cooling coil supported by the lower portion of said drive shaft and communicating therewith, whereby the cooling water, after exerting impulse reaction against the vanes of said turbine wheels, passes downwardly through said hollow drive shaft and thence through said rotating cooling coil for cooling the milk, said tubular drive shaft and turbine wheel being capable of vertical shifting movement in said housing for disposing the turbine vanes at different heights relatively to said inlet nozzle, an outlet port establishing a communication of constant size between the interior of said drive shaft and the chamber area lying above said turbine wheel, and a lower outlet port in the wall of said tubular drive shaft for discharging water from the area below said turbine wheel into said tubular drive shaft, and means coacting with said lower port for varying the effective area thereof as said shaft and turbine wheel are displaced vertically.

10. In apparatus of the class described for cooling milk in the conventional milk can, the combination of a support adapted to rest in the open top of said can, said support comprising an outwardly sloping and downwardly sloping top surface discharging out over the top of the can, a stationary housing carried by said support and spaced upwardly therefrom, a water wheel in said housing, an inlet nozzle for discharging cooling water against said water wheel, a tubular drive shaft rotatably supporting said water wheel and extending downwardly from said housing, a cooling coil carried by said drive shaft and communicating therewith, whereby the cooling water, after imparting reaction energy against said water wheel, is conveyed downwardly through said tubular drive shaft and thence through said cooling coil for cooling the milk, a rotating outlet chamber disposed below said housing and receiving the outlet water from said cooling coil, a stationary outlet connection for receiving the outlet water from said chamber, a stationary outlet duct leading from said stationary outlet connection for discharging the water therefrom, there being a rotating joint between said rotating outlet chamber and said stationary outlet connection, and a downwardly and outwardly sloping spinner surface on said rotating chamber below the plane of said water wheel for conveying any leakage water from said joint downwardly and outwardly for precipitation on the downwardly and outwardly sloping upper surface of said support.

JOHN R. BOYLE.

References Cited in the file of this patent
UNITED STATES PATENTS

| Number | Name | Date |
|---|---|---|
| 810,955 | Lund | Jan. 30, 1906 |
| 1,167,018 | Pyle | Jan. 4, 1916 |
| 1,307,703 | Sagberg et al. | June 24, 1919 |
| 1,759,578 | Kelso | May 20, 1930 |
| 1,838,610 | Bodes | Dec. 29, 1931 |
| 1,984,581 | Hasselberg | Dec. 18, 1934 |
| 2,217,379 | Peardon | Oct. 8, 1940 |